US012096797B2

(12) United States Patent
Spencer et al.

(10) Patent No.: US 12,096,797 B2
(45) Date of Patent: Sep. 24, 2024

(54) APPARATUS FOR VOLATILIZING AEROSOLIZABLE MATERIAL

(71) Applicant: NICOVENTURES TRADING LIMITED, London (GB)

(72) Inventors: Alfred Vincent Spencer, London (GB); Connor Bruton, London (GB); Richard Hepworth, London (GB); Michael Simpson, London (GB)

(73) Assignee: NICOVENTURES TRADING LIMITED, London (GB)

( * ) Notice: Subject to any disclaimer, the term of this patent is extended or adjusted under 35 U.S.C. 154(b) by 735 days.

(21) Appl. No.: 15/733,156

(22) PCT Filed: Nov. 29, 2018

(86) PCT No.: PCT/EP2018/083036
§ 371 (c)(1),
(2) Date: May 29, 2020

(87) PCT Pub. No.: WO2019/106102
PCT Pub. Date: Jun. 6, 2019

(65) Prior Publication Data

US 2020/0352240 A1 Nov. 12, 2020

(30) Foreign Application Priority Data

Nov. 29, 2017 (GB) ..................................... 1719867

(51) Int. Cl.
*A24F 40/46* (2020.01)
*A24F 40/48* (2020.01)
(Continued)

(52) U.S. Cl.
CPC .............. *A24F 40/46* (2020.01); *A24F 40/48* (2020.01); *A24F 40/485* (2020.01); *H05B 1/0227* (2013.01); *A24F 40/20* (2020.01)

(58) Field of Classification Search
CPC ...................................................... A24F 40/46
See application file for complete search history.

(56) References Cited

U.S. PATENT DOCUMENTS 5,269,327 A 12/1993 Counts et al.
5,591,368 A 1/1997 Fleischhauer et al.
(Continued)

FOREIGN PATENT DOCUMENTS

CN 203986081 12/2014
CN 205072071 U 3/2016
(Continued)

OTHER PUBLICATIONS

International Search Report, Application No. PCT/EP2018/083036, dated Mar. 29, 2019, 2 pages.
(Continued)

*Primary Examiner* — Cynthia Szewczyk
(74) *Attorney, Agent, or Firm* — Husch Blackwell LLP

(57) ABSTRACT

There is described an apparatus for heating aerosolizable material to volatilize at least one component of the aerosolizable material. The apparatus includes a heating chamber for containing aerosolizable material and a first heater arrangement for heating aerosolizable material contained in use within the heating chamber. The first heater arrangement is arranged to heat at least two sides of the aerosolizable material in the heating chamber. There is further provided an air flow channel outside of the heating chamber that runs alongside the first heater arrangement and is arranged such that, in use, when a user draws on a device comprising the apparatus, air flows into the apparatus and through the air flow channel so as to be preheated in the air flow channel by the first heater arrangement before flowing into the heating chamber and through the aerosolizable material.

11 Claims, 4 Drawing Sheets

(51) Int. Cl.
*A24F 40/485* (2020.01)
*H05B 1/02* (2006.01)
*A24F 40/20* (2020.01)

(56) References Cited

U.S. PATENT DOCUMENTS

| | | | | |
|---|---|---|---|---|
| 5,894,841 | A | 4/1999 | Voges | |
| 2007/0102013 | A1 | 5/2007 | Adams | |
| 2008/0092912 | A1 | 4/2008 | Robinson | |
| 2009/0272379 | A1 | 11/2009 | Thorens | |
| 2010/0313901 | A1 | 12/2010 | Fernando | |
| 2011/0126848 | A1 | 6/2011 | Zuber | |
| 2011/0277764 | A1 | 11/2011 | Terry | |
| 2014/0069424 | A1 | 3/2014 | Poston | |
| 2014/0144429 | A1 | 5/2014 | Wensley | |
| 2014/0209105 | A1* | 7/2014 | Sears | A24F 40/44 131/328 |
| 2014/0261493 | A1 | 9/2014 | Smith | |
| 2014/0283855 | A1 | 9/2014 | Hawes | |
| 2014/0338686 | A1* | 11/2014 | Plojoux | A24F 40/485 131/329 |
| 2014/0366898 | A1 | 12/2014 | Monsees | |
| 2014/0373859 | A1 | 12/2014 | Raether | |
| 2015/0117842 | A1* | 4/2015 | Brammer | A61M 15/06 392/394 |

FOREIGN PATENT DOCUMENTS

| | | | |
|---|---|---|---|
| CN | 106509995 | A | 3/2017 |
| EA | 200800999 | A1 | 8/2008 |
| EP | 0430559 | | 6/1991 |
| GB | 2515562 | | 12/2014 |
| JP | H03232481 | A | 10/1991 |
| JP | 2009509523 | A | 3/2009 |
| JP | 2015504667 | A | 2/2015 |
| RU | 2602053 | C2 | 11/2016 |
| WO | WO 13083635 | | 6/2013 |
| WO | 2013102609 | A2 | 7/2013 |
| WO | WO 13120849 | | 8/2013 |
| WO | WO 13131764 | | 9/2013 |
| WO | WO 13138898 | | 9/2013 |
| WO | WO 14012907 | | 1/2014 |

OTHER PUBLICATIONS

International Preliminary Report on Patentability received for Patent Application No. PCT/EP2018/083036, dated Jun. 11, 2020, 9 pages.

Office Action and Search Report receivedfor Russian Patent Application No. 2021119329, dated Dec. 24, 2021, 7 pages (Official Copy Only).

Notice of Reasons of Refusal received for Japanese Application No. 2020-528341, dated Jun. 8, 2020, 35 pages (18 pages of English Translation and 17 pages of Official Copy).

"International Preliminary Report on Patentability for Patent Application No. PCT/EP2018/083036, dated Jun. 11, 2020", 9 pages.

"Office Action and Search Report for Russian Patent Application No. 2021119329, dated Dec. 24, 2021", 7 pages (Only Official Copy).

"Office Action for Japanese Application No. 2020-528341, dated Jun. 8, 2020", 35 pages (18 pages of English Translation and 17 pages of official copy).

"Search Report received for Russian Patent Application No. 2020117157, dated Dec. 21, 2020", 2 pages (Only Official Copy).

* cited by examiner

APPARATUS FOR VOLATILIZING AEROSOLIZABLE MATERIAL

PRIORITY CLAIM

The present application is a National Phase entry of PCT Application No. PCT/EP2018/083036, filed Nov. 29, 2018, which claims priority from GB Patent Application No. 1719867.2, filed Nov. 29, 2017, which is hereby fully incorporated herein by reference.

TECHNICAL FIELD

The present disclosure relates to an apparatus for volatilizing aerosolizable material.

BACKGROUND

Smoking articles such as cigarettes, cigars and the like burn tobacco during use to create tobacco smoke.

Attempts have been made to provide alternatives to these articles that burn tobacco by creating products that release compounds without burning.

Examples of such products are heating devices which release compounds by heating, but not burning, the material. The material may be for example tobacco or other non-tobacco products, which may or may not contain nicotine. Such products are sometimes referred to as Tobacco Heating Products (THP).

As another example, there are so-called e-cigarette devices. These devices typically contain a liquid which is heated to vaporize the liquid to produce an inhalable vapor or aerosol. The liquid may contain nicotine and/or flavorings and/or aerosol-generating materials, such as glycerol. The known e-cigarette devices typically do not contain or use tobacco.

As yet another example, there are so-called hybrid devices. These hybrid devices typically contain separately a liquid and tobacco or other flavor material. The liquid is heated to vaporize the liquid to produce an inhalable vapor or aerosol which passes through the tobacco or other flavor material so that a flavor is imparted to the vapor or aerosol.

SUMMARY

According to a first aspect of the present disclosure, there is provided an apparatus for heating aerosolizable material to volatilize at least one component of said aerosolizable material, the apparatus comprising: a heating chamber for containing aerosolizable material; a first heater arrangement for heating aerosolizable material contained in use within the heating chamber, the first heater arrangement arranged to heat at least two sides of the aerosolizable material in the heating chamber; an air flow channel outside of the heating chamber that runs alongside the first heater arrangement, and arranged such that, in use, when a user draws on a device comprising the apparatus, air flows into the apparatus and through the air flow channel so as to be preheated in the air flow channel by the first heater arrangement before flowing into the heating chamber and through the aerosolizable material.

The apparatus may further comprise a heat insulating member and wherein the air flow channel is between the heat insulating member and the first heater arrangement.

The first heater arrangement and the air flow channel may extend axially along the apparatus.

According to a second aspect of the present disclosure there is provided an apparatus for volatilizing aerosolizable material, the apparatus comprising: a chamber for containing aerosolizable material; an arrangement for volatilizing aerosolizable material contained in use within the chamber to form a vapor and/or an aerosol; a heater arrangement for heating an incoming air flow, which in use flows into the apparatus when a user draws on a system comprising the apparatus, prior to the air flow flowing through the aerosolizable material; and an air flow director arranged within the heater arrangement to direct the incoming air flow to flow in close proximity to a heating surface of the heater arrangement.

The air flow director may be an elongate member that extends axially in the apparatus.

The air flow director may extend in a space defined by the arrangement for volatilizing aerosolizable material.

BRIEF DESCRIPTION OF THE DRAWINGS

Embodiments of the disclosure will now be described, by way of example only, with reference to the accompanying drawings, in which.

DETAILED DESCRIPTION OF THE DRAWINGS

Figure 1:
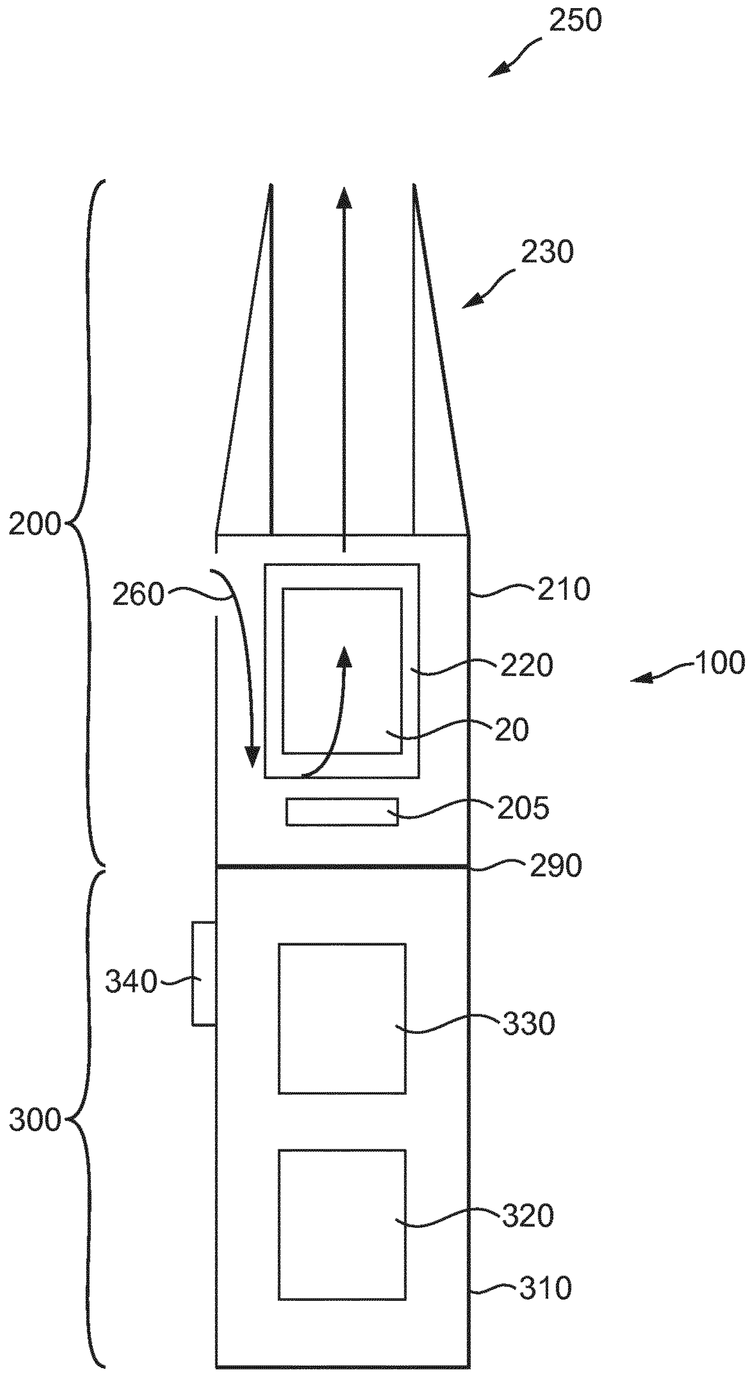
FIG. 1 shows a schematic longitudinal cross-sectional view of a first aerosol provision system for generating an inhalable medium.

Referring to FIG. 1, a schematic of an aerosol provision system 100 is illustrated. The aerosol provision system 100 is an inhalation device (i.e. a user uses it to inhale an aerosol provided by the system 100) and the system 100 is a hand-held system. In this example, the system 100 is an electronic device.

In broad outline, the system 100 volatilizes a aerosolizable or aerosol generating material 20, for example a material comprising tobacco, by heating but not burning the material 20, to form a vapor and/or an aerosol which mixes with an air flow when a user draws on the system 100, to provide a flow of a vapor and/or an aerosol for inhalation by a user.

In at least some examples a vapor is produced that then at least partly condenses to form an aerosol that mixes with the air flow before exiting the system 100 for inhalation by a user (not shown).

In this respect, first it may be noted that, in general, a vapor is a material in the gas phase at a temperature lower than its critical temperature, which means that for example the vapor can be condensed to a liquid by increasing its pressure without reducing the temperature. On the other hand, in general, an aerosol is a colloid of fine solid particles or liquid droplets, in air or another gas. A "colloid" is a material in which microscopically dispersed insoluble particles are suspended throughout another material.

For reasons of convenience, as used herein the term aerosol should be taken as meaning an aerosol, a vapor or a combination of an aerosol and vapor.

Returning to FIG. 1, the system 100 of this example comprises an aerosol provision article 200 and an aerosol provision device 300. The aerosol provision article 200 is for containing the material 20 and a heating arrangement 205 for heating but not burning the material 20. The aerosol provision device 300 is for powering and controlling the system 100.

In this example, the aerosol provision article 200 comprises a first 'upper' housing 210 and the aerosol provision device 300 comprises a second 'lower' housing 310. In this example, the upper housing 210 is releasably connectable to the lower housing 310.

The first housing 210 is generally elongate and comprises a heating chamber 220 for containing the material 20. The first housing 210 further comprises a mouthpiece 230 at a proximal end 250 of the system 100 in fluid communication with the heating chamber 220 and through which the user can inhale the flow of aerosol that is generated in use. The mouthpiece 230 (or at least the tip of the mouthpiece 3) may comprise a material that feels comfortable to the lips, for example, suitable plastics or silicone rubber based materials. The mouthpiece 230 may be an integral part of the upper housing 210 or it may be separably attachable to the first housing 210.

The first housing 210 may also comprise one or more inlets 260 for allowing air to flow into the first housing 210 in use when a user draws on the mouthpiece 230.

The first housing 210 also contains a first heating arrangement 205 for heating the material 20 to volatilise at least one component of the material 20 to generate an aerosol. This aerosol then mixes with airflow that flows through the one or more inlets 260 into the first housing 210 and then into the heating chamber 220 and through the material 20 to generate a flow of aerosol before exiting the aerosol provision article 200 when a user draws on the aerosol provision article 200.

The first housing 210 further comprises a base section 290 that connects to the second housing 310. To that end, the base section 290 comprises a connector part, for example, a screw thread or a bayonet fit for releasably connecting the first housing 210 to the second housing 310.

The second housing 310 contains a power source 320, typically a battery, for powering various components of the system 100, including the heating arrangement 205, to which it is electrically connected when the first housing 210 and the second housing 310 are connected together, as will be discussed further below.

The battery 320 may be a rechargeable battery or a disposable battery. A controller 330, which may comprise a micro-chip and associated circuitry is also provided in the second housing 310 for controlling the operation of various components of the system 100, as will be discussed further below. A user input means 340, for example one or more control buttons, may be provided on the exterior of the second housing 310 for a user to operate the controller 330.

Accordingly, in use, as a user draws on the mouthpiece 230 at proximal end 250, air is drawn through the one or more air inlets 260. The heater arrangement 205 is powered by the user operating the control button 340 (or alternatively by a puff detector (not shown), as is known per se) to heat but not burn the material 20 in the heating chamber 220 to volatilize the material 20 to generate aerosol which mixes with air flowing from the air inlet 260 to produce a flow of aerosol (as indicated by the arrows). The flow of aerosol is drawn through the mouthpiece 230 then out of the system 100 for inhalation by the user.

The material 20 may comprise of tobacco per se, different varieties of tobacco, tobacco derivatives, expanded tobacco, reconstituted tobacco, ground tobacco, tobacco extract, homogenized tobacco or tobacco substitutes. In the case of tobacco, the material 30, etc. may be in the form of a rod of tobacco, a pod or plug of tobacco, loose tobacco, agglomerates, etc., and may be in relatively dry form or in relatively moist form for example. The material 30 may include other, non-tobacco, products, which, depending on the product, may or may not contain nicotine.

In some examples, the material 20 is provided in the form of loose tobacco is the heating chamber 220. In other examples, the material material 20 is provided in the form of tobacco which is itself contained in a consumable article that is inserted into the heating chamber. The consumable may be elongate and at least part of it may extend out of the heating chamber 220 and out of the first housing 210. In these example, a proximal end of the consumable may be used as a mouthpiece through which the flow of aerosol exits the system 100 for inhalation by a user. In these examples, the first housing 210 need not be provided with a mouthpiece per se.

It will be understood however that materials other than tobacco (or in addition to tobacco) may be used as a flavorant to impart a different flavor to the flow of aerosol.

Figure 2A:
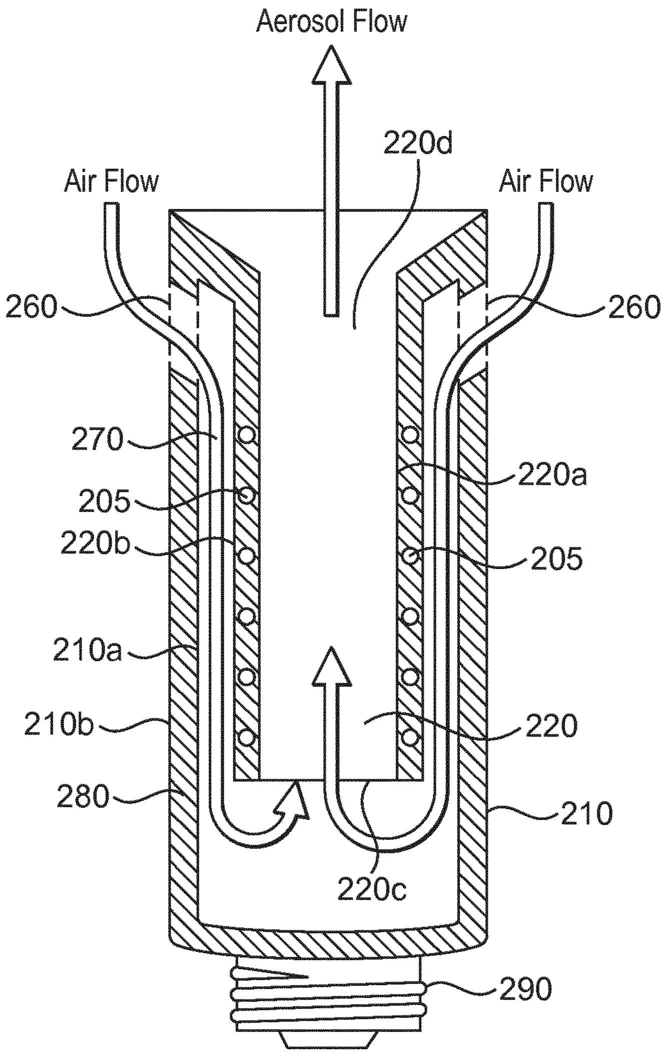
FIG. 2*a* illustrates schematically a longitudinal cross-sectional view of a first example of an article for use as part of the aerosol provision system shown in FIG. 1.

Referring now to FIG. 2 there is illustrated schematically a first example of an aerosol provision article 200 for use in the system 100 of FIG. 1. In this example, the heating arrangement 205 is arranged between inner 220*a* and outer 220*b* walls of the heating chamber 220 and extends along at least two sides of the heating chamber 220.

The outer wall 220*b* of the heating chamber 220 and an inner surface 210*a* of the first housing 210 define between them an airflow path 270 into which air may flow into the first housing 210 through the one or more air inlets 260. In examples in which the heating chamber 220 and the first housing 210 are generally cylindrical in shape, the airflow path 270 will be generally annular in shape.

The upper housing 210 may comprise a heat insulation layer 280 between the airflow path 270 and an outer surface 210*b* of the first housing 210. In one example, the heat insulation layer 280 is provided by a vacuum tube, located between the outer surface 210*b* of the upper housing 210 and the airflow path 270, for example, located between the inner 210*a* and outer 210*b* surfaces of the first housing 210.

Accordingly, in use, as a user draws on the mouthpiece 230 at proximal end 250 (not illustrated in FIG. 2*a*), air is drawn through the one or more air inlets 260 and flows along the airflow path 270 and into the heating chamber 220 through an inlet 220*c* at the distal end of the heating chamber 220.

As explained above, the heater arrangement 205 is powered by the user operating the control button 340 (not shown in FIG. 2*a*) (or alternatively by a puff detector (not shown), as is known per se) to heat but not burn the material 20 in the heating chamber 220 to volatilize the material 20 to generate aerosol which mixes with air flow to produce a flow of aerosol (as indicated by the arrows) for inhalation by the user.

As the air flows along the path 270 prior to entering the heating chamber 270 it flows in close proximity to the heating arrangement 205. The heating arrangement 205 and the path 270 both extends axially within the first housing 210 along at least two sides of the heating chamber 270 and this facilitates the amount of pre-heating of the airflow before it enters the heating chamber 220.

In some examples, the air in the airflow is pre-heated to between 0° C. to 240° C. and, for example, from ambient to around 150° C., before it enters heating chamber 270.

The heating arrangement 205 may comprises any suitable type of heater or heaters including an electrically resistive heater, for example a nichrome resistive heater, a ceramic heater, a thin film heater, an inductive heater, etc.

In the example shown, the heating arrangement comprises a tube that surrounds the heating chamber 220 and defines an inlet 220*c* for the airflow and an outlet 220*d* for the flow of aerosol at its ends.

In use, and particularly in the case that the material 20 is tobacco, it can be advantageous that the tobacco is heated to a temperature of between around 175° C. to 250° C., such as around 200° C., so as to ensure that an adequate or appropriate amount of the compounds are released from the tobacco.

It will be appreciated that the material is heated directly by the heating arrangement 205, for example by conduction, and indirectly by the pre-heated hot air flow (i.e. by convection)

Figure 2B:
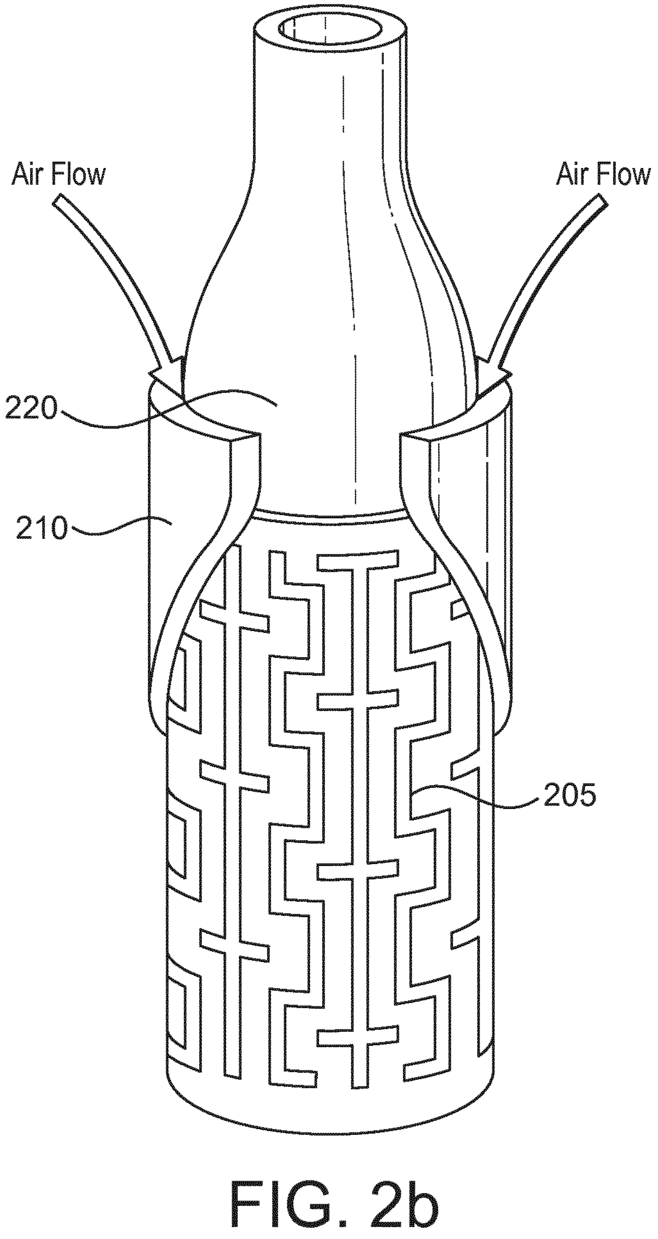
FIG. 2*b* illustrates schematically a perspective cut a way view of a second example of an article for use as part of the aerosol provision system shown in FIG. 1.

FIG. 2*b* illustrates schematically a section of an alternative aerosol provision article 200 for use in the system 100 of FIG. 1. In this example, the heating arrangement 205 is in the form of a series of conductive tracks formed around the outer surface 220*b* of the heating chamber 220.

Figure 3A:
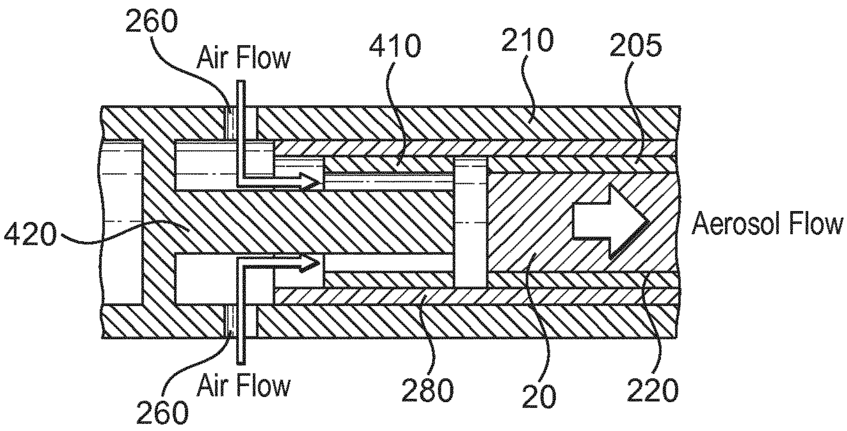
FIG. 3*a* illustrates schematically a longitudinal cross-sectional view of a section of a third example of an article for use as part of the aerosol provision system shown in FIG. 1.
Figure 3B:
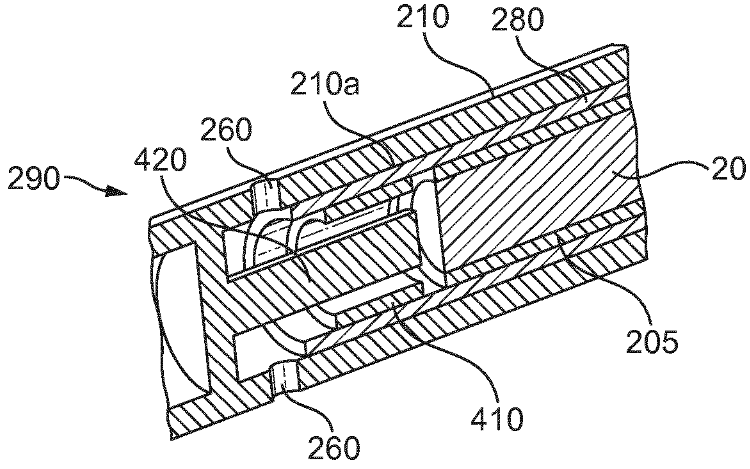
FIG. 3*b* illustrates schematically a perspective sectional view of the section of the third example of an article for use as part of the aerosol provision system shown in FIG. 1.

FIGS. 3*a* and 3*b* schematically illustrate a section of another aerosol provision article 200 that can be used in the system 100 of FIG. 1. In this example, the one or more air inlets 260 in the first housing 210 are provided upstream of the heating chamber 220 and towards the base section 290 of the first housing 210.

In this example, the first housing 210 further contains a second heater arrangement 410, separate from and upstream from the heater arrangement 205 in the heating chamber 220. The second heater arrangement 410 is dedicated to pre-heating the air flow through the one or more air inlets 260 prior to the air flow entering the material 20.

As with the first heater arrangement 205, the second heater arrangement 410 may take any suitable form but in the example illustrated in FIGS. 3*a* and 3*b* the second heater arrangement 410 and the first heater arrangement 205 are both tubular or ring shaped thin film heaters and the heat insulation layer 280 is provided by a vacuum tube located between the inner wall of the housing and the second heater arrangement 410 and the heater arrangement 205. Accordingly, in this example, the first heater arrangement 205 and the second heater arrangement 410 are arranged substantially co-axially but axially spaced apart.

In an alternative arrangement, not illustrated, the second heater arrangement 410 may comprise a nichrome element rather than a thin film heater. As is known, the temperature of a nichrome element can typically be raised more rapidly than of a thin film heater.

The first housing 210 further contains an air flow director 420 for directing the airflow over the hot inner surface of the second heater arrangement 410, in close proximity to the surface, to optimize the heating of the air flow.

In the example shown, the air flow director 420 is in the form of an elongate member, for example a pin, that extends axially in the second heater arrangement 410. Accordingly, in this example, the air flow director 420 and the second heater arrangement 410 define an annular flow path for the airflow. The air flow director 420 need not be directly heated itself.

In the example shown in FIGS. 3*a* and 3*b*, the first heater arrangement 205 is used to volatilize the material 20 to form a vapor and/or an aerosol. In other examples, other types of arrangements may instead be used for volatilizing the material 20 to form a vapor and/or an aerosol which do not necessarily involve heating. As will be appreciated by those skilled in the art such arrangement may involve at least one of a piezo-electric system, a vibrating mesh on which the material 20 is located, a light source, a chemical source or indeed any suitable means for volatilizing the material 20 to form a vapor and/or an aerosol.

In the above examples, the first housing 210 and the second housing 310 are shown be releasably connectable. In other examples, instead of a first housing 210 and the second housing 310 that are releasably connectable, the system 100 comprises a single housing that contains the components of the system.

Above has been described an apparatus for heating aerosolizable material, the apparatus comprising: a heating chamber for containing aerosolizable material; a first heater arrangement for heating aerosolizable material contained in use within the heating chamber; a second heater arrangement for heating incoming air which in use flows into the apparatus when a user draws on a device comprising the apparatus; and an air flow director arranged within the second heater arrangement to direct the incoming air to flow in close proximity to a heating surface of the second heater arrangement.

As used herein, the terms “flavor” and “flavorant” refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie™, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In order to address various issues and advance the art, the entirety of this disclosure shows by way of illustration and example various embodiments in which the claimed invention may be practiced and which provide for a superior system arranged to generate an inhalable medium. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An apparatus for volatilizing aerosolizable material, the apparatus comprising:

a chamber for containing aerosolizable material;

an arrangement for volatilizing aerosolizable material contained in use within the chamber to form at least one of a vapor or an aerosol;

a heater arrangement for heating an incoming air flow, which in use flows into the apparatus when a user draws on a system comprising the apparatus, prior to the air flow flowing through the aerosolizable material; and an air flow director arranged within the heater arrangement to direct the incoming air flow to flow in close proximity to a heating surface of the heater arrangement, wherein the air flow director is an elongate member that extends axially in the apparatus, and wherein the heater arrangement and the elongate member define an annular flow path through which the air flows through the heater arrangement.

2. The apparatus according to claim 1, wherein the air flow director extends in a space defined by the heater arrangement.

3. The apparatus according to claim 2, wherein the heater arrangement is a tube or a ring and the elongate member extends within the tube or the ring.

4. The apparatus according to claim 1, wherein the arrangement for volatilizing aerosolizable material and the heater arrangement are arranged substantially co-axially and axially spaced apart.

5. The apparatus according to claim 1, wherein the arrangement for volatilizing aerosolizable material is a further heating arrangement.

6. The apparatus according to claim 5, wherein the further heating arrangement surrounds the chamber.

7. The apparatus according to claim 1, further comprising:

a housing containing the arrangement for volatilizing aerosolizable material, the heater arrangement and the air flow director.

8. The apparatus according to claim 7, wherein the housing comprises one or more air inlets to enable the air flow into the apparatus.

9. A device for generating a flow of aerosol for inhalation by a user the device comprising the apparatus for volatilizing aerosolizable material according to claim 1.

10. The device according to claim 9, further comprising a power source for powering the device and control electronics.

11. The device according to claim 9, further comprising a mouthpiece.

* * * * *